US012562938B2

(12) United States Patent
Cheng

(10) Patent No.: US 12,562,938 B2
(45) Date of Patent: Feb. 24, 2026

(54) ATTACK DETECTION METHOD FOR Wi-Fi SECURE RANGING FROM TRANSMITTER TO RECEIVER

(71) Applicant: MEDIATEK INC., Hsin-Chu (TW)

(72) Inventor: Ching-Chia Cheng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/677,902

(22) Filed: May 30, 2024

(65) Prior Publication Data

US 2024/0406031 A1 Dec. 5, 2024

Related U.S. Application Data

(60) Provisional application No. 63/505,068, filed on May 31, 2023.

(51) Int. Cl.
*H04L 25/02* (2006.01)
*H04L 25/03* (2006.01)

(52) U.S. Cl.
CPC .... *H04L 25/0202* (2013.01); *H04L 25/03305* (2013.01)

(58) Field of Classification Search
CPC ......... H04L 9/002; H04L 9/003; H04L 9/004; H04L 9/005; H04L 2463/00; H04L 2463/141; H04L 2463/142; H04L 2463/143
See application file for complete search history.

(56) References Cited

U.S. PATENT DOCUMENTS

| | | | | |
|---|---|---|---|---|
| 9,781,670 | B2 * | 10/2017 | Seok | H04W 52/0225 |
| 9,806,912 | B2 * | 10/2017 | Barbu | H04L 25/067 |
| 10,135,638 | B2 * | 11/2018 | Lindskog | H04L 25/0226 |
| 10,277,425 | B2 * | 4/2019 | Lindskog | H04W 12/122 |
| 10,555,257 | B2 * | 2/2020 | Yang | H04W 52/0216 |
| 10,694,407 | B2 * | 6/2020 | Seok | H04W 4/00 |
| 10,735,163 | B2 * | 8/2020 | Berger | H04W 12/037 |
| 10,785,682 | B2 * | 9/2020 | Chuang | H04W 16/14 |
| 10,826,645 | B2 * | 11/2020 | Zeng | G06F 17/11 |
| 11,166,159 | B1 * | 11/2021 | Berger | H04L 9/06 |
| 11,172,445 | B2 * | 11/2021 | Kim | H04W 52/02 |
| 11,184,854 | B2 * | 11/2021 | Kim | H04W 52/0216 |
| 11,277,739 | B2 * | 3/2022 | Min | H04L 5/0048 |
| 11,490,251 | B2 * | 11/2022 | Seok | H04W 12/06 |
| 11,553,410 | B2 * | 1/2023 | Chowdhury | H04W 48/16 |

(Continued)

*Primary Examiner* — James M Perez
(74) *Attorney, Agent, or Firm* — Winston Hsu

(57) ABSTRACT

A transmitter applies secure sequences on each symbol and each sub-carrier of K long training fields (LTFs). A receiver receives the K LTFs each having N symbols. An attack detection method for Wi-Fi secure ranging from the transmitter to the receiver includes using a channel estimation (CE) result of N symbols in a first LTF of the K LTFs to demodulate symbols in a Kth LTF of the K LTFs to obtain demodulated secure sequences of the symbols in the Kth LTF, generating respective bit error rates (BERs) of the N symbols in the Kth LTF by comparing applied secure sequences of the symbols in the Kth LTF with demodulated secure sequences of symbols in the Kth LTF, and verifying if the Kth LTF has been attacked according to the respective BERs of the N symbols in the Kth LTF and average BERs for the symbols in the Kth LTF.

20 Claims, 6 Drawing Sheets

(56)  References Cited

U.S. PATENT DOCUMENTS

| | | | | |
|---|---|---|---|---|
| 11,678,211 B2 * | 6/2023 | Duan | H04W 24/10 370/329 |
| 11,778,582 B2 * | 10/2023 | Segev | H04W 12/104 455/456.1 |
| 11,930,453 B2 * | 3/2024 | Terry | H04W 52/0229 |
| 12,074,819 B2 * | 8/2024 | Li | H04W 12/12 |
| 2008/0212652 A1 * | 9/2008 | Parker | H04L 27/2601 375/E1.035 |
| 2009/0103666 A1 * | 4/2009 | Zhao | H04L 27/2647 375/341 |
| 2010/0303165 A1 * | 12/2010 | Gore | H04L 25/0202 375/348 |
| 2017/0195916 A1 * | 7/2017 | Tujkovic | H04B 1/1027 |
| 2017/0359134 A1 * | 12/2017 | Baier | H04L 25/0224 |
| 2018/0011179 A1 * | 1/2018 | Zhang | G01S 5/0205 |
| 2018/0138993 A1 * | 5/2018 | Küchler | H04L 25/0202 |
| 2018/0254923 A1 * | 9/2018 | Dutz | H04L 27/2662 |
| 2018/0287826 A1 * | 10/2018 | Lindskog | H04L 25/0204 |
| 2019/0014466 A1 * | 1/2019 | Seok | H04W 84/12 |
| 2019/0036739 A1 * | 1/2019 | Lindskog | H04L 25/0224 |
| 2019/0052484 A1 * | 2/2019 | Lindskog | H04L 63/14 |
| 2019/0141537 A1 * | 5/2019 | Jiang | H04K 3/00 |
| 2019/0174351 A1 * | 6/2019 | Chuang | H04L 27/2613 |
| 2019/0246351 A1 * | 8/2019 | Yang | H04W 52/0229 |
| 2019/0363820 A1 * | 11/2019 | Zeng | H04K 3/228 |
| 2020/0015164 A1 * | 1/2020 | Asterjadhi | H04W 52/0229 |
| 2020/0132857 A1 * | 4/2020 | Berger | H04W 64/003 |
| 2020/0229090 A1 * | 7/2020 | Kim | H04W 52/0229 |
| 2021/0068070 A1 * | 3/2021 | Segev | H04L 67/10 |
| 2021/0120405 A1 * | 4/2021 | Kim | H04L 27/2656 |
| 2021/0218527 A1 * | 7/2021 | Li | H04L 27/0008 |
| 2021/0344541 A1 * | 11/2021 | Shellhammer | H04L 27/2605 |
| 2021/0377728 A1 * | 12/2021 | Min | H04W 12/037 |
| 2022/0070777 A1 * | 3/2022 | Terry | H04W 52/0229 |
| 2022/0224579 A1 * | 7/2022 | Raissinia | H04W 12/037 |
| 2022/0277075 A1 * | 9/2022 | Cummings | H04L 67/51 |
| 2022/0353718 A1 * | 11/2022 | Duan | H04W 24/10 |
| 2023/0300005 A1 * | 9/2023 | Dotlic | H04W 4/023 455/456.1 |
| 2024/0031093 A1 * | 1/2024 | Li | H04L 27/2626 |
| 2024/0142606 A1 * | 5/2024 | Gutin | H04W 12/104 |
| 2024/0172117 A1 * | 5/2024 | Terry | H04W 52/0229 |
| 2024/0373229 A1 * | 11/2024 | Lopez | H04B 17/309 |
| 2024/0389061 A1 * | 11/2024 | Duan | H04W 64/00 |
| 2024/0396689 A1 * | 11/2024 | Manolakos | H04W 64/00 |
| 2024/0406031 A1 * | 12/2024 | Cheng | H04L 25/0202 |
| 2024/0406731 A1 * | 12/2024 | Duan | H04W 12/12 |
| 2025/0038908 A1 * | 1/2025 | Manolakos | H04L 27/2613 |
| 2025/0056486 A1 * | 2/2025 | Li | H04W 56/0015 |
| 2025/0142483 A1 * | 5/2025 | Pettersson | H04K 3/43 |
| 2025/0261019 A1 * | 8/2025 | Dong | H04W 24/10 |

* cited by examiner

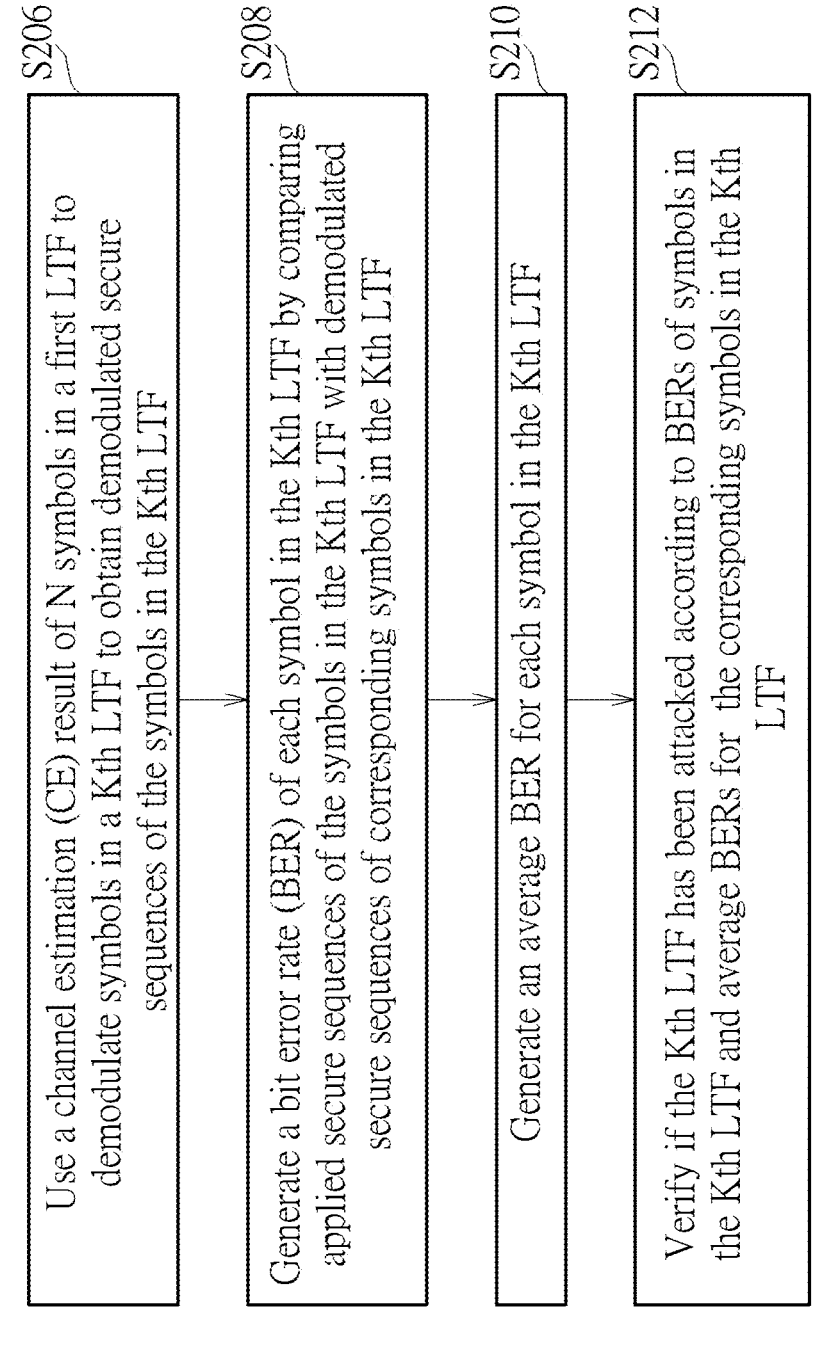

S206

Use a channel estimation (CE) result of N symbols in a first LTF to demodulate symbols in a Kth LTF to obtain demodulated secure sequences of the symbols in the Kth LTF

S208

Generate a bit error rate (BER) of each symbol in the Kth LTF by comparing applied secure sequences of the symbols in the Kth LTF with demodulated secure sequences of corresponding symbols in the Kth LTF

S210

Generate an average BER for each symbol in the Kth LTF

S212

Verify if the Kth LTF has been attacked according to BERs of symbols in the Kth LTF and average BERs for the corresponding symbols in the Kth LTF

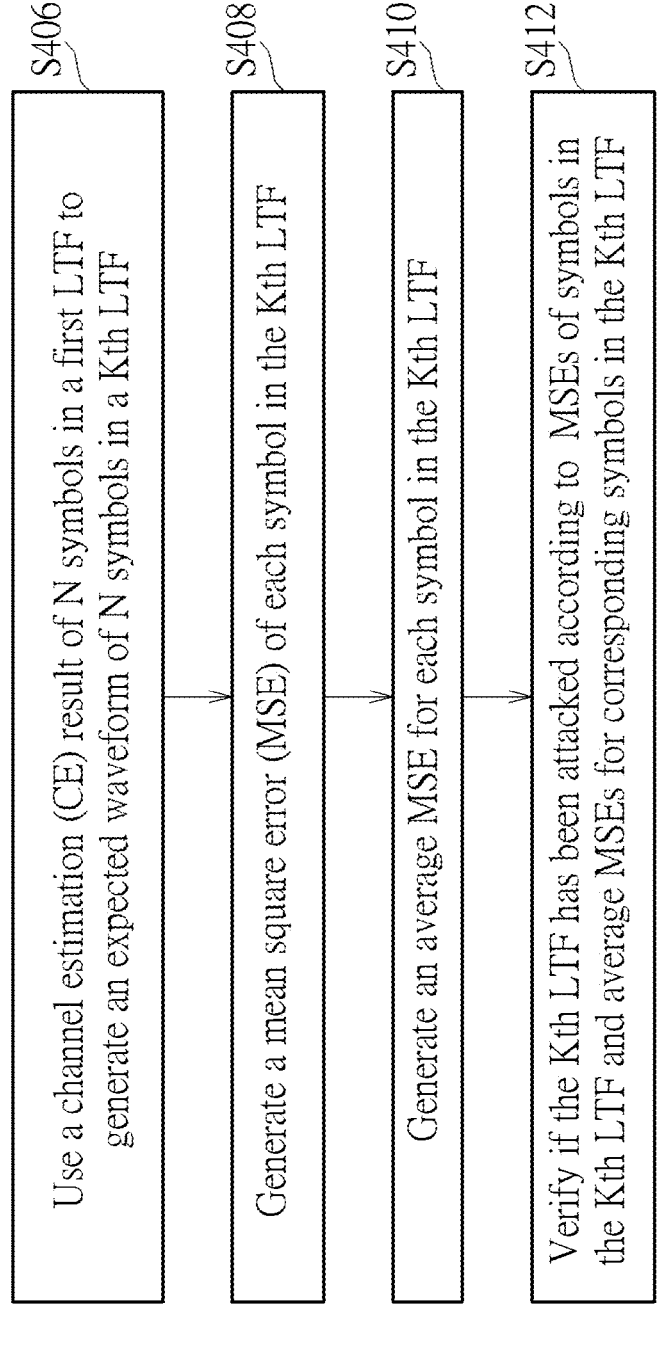

S406 Use a channel estimation (CE) result of N symbols in a first LTF to generate an expected waveform of N symbols in a Kth LTF S408 Generate a mean square error (MSE) of each symbol in the Kth LTF S410 Generate an average MSE for each symbol in the Kth LTF S412 Verify if the Kth LTF has been attacked according to MSEs of symbols in the Kth LTF and average MSEs for corresponding symbols in the Kth LTF

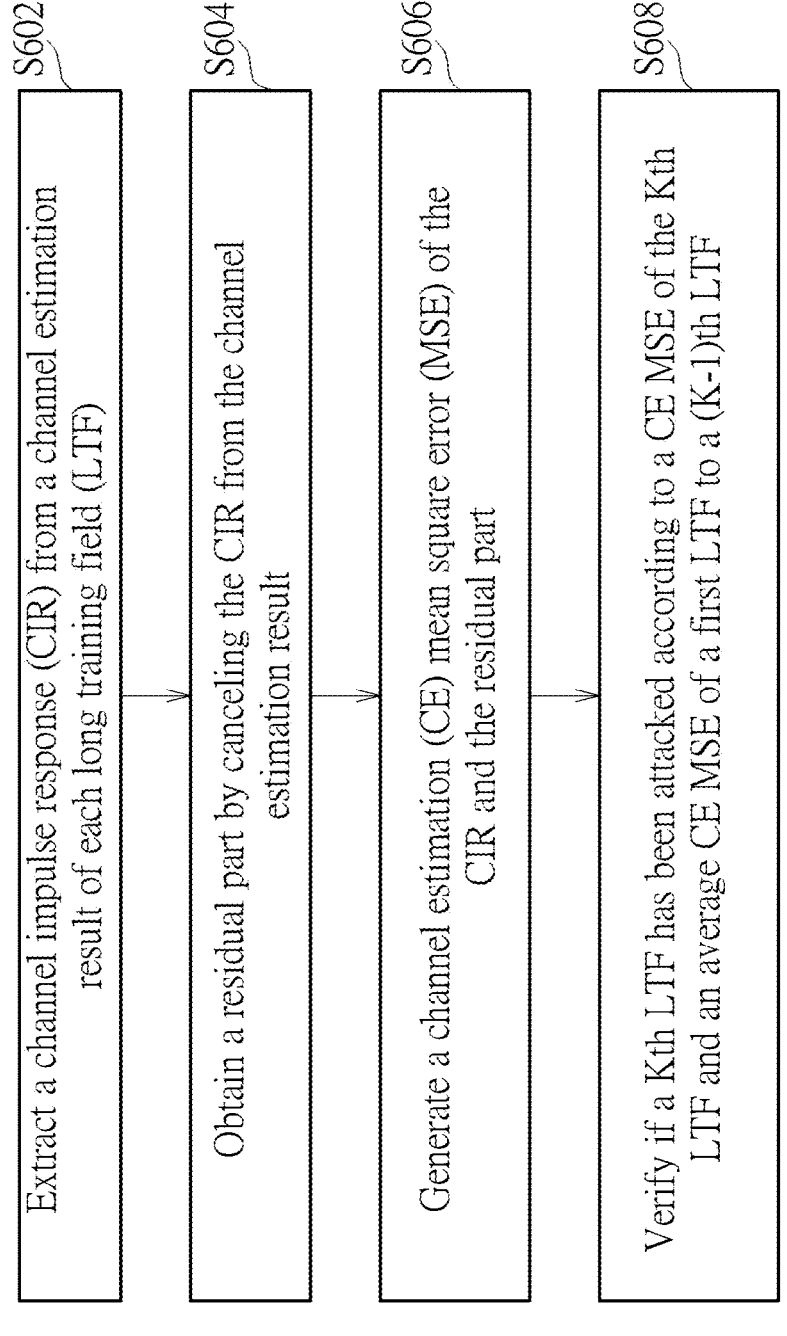

S602 Extract a channel impulse response (CIR) from a channel estimation result of each long training field (LTF)

S604 Obtain a residual part by canceling the CIR from the channel estimation result S606 Generate a channel estimation (CE) mean square error (MSE) of the CIR and the residual part S608 Verify if a Kth LTF has been attacked according to a CE MSE of the Kth LTF and an average CE MSE of a first LTF to a (K-1)th LTF

ATTACK DETECTION METHOD FOR Wi-Fi SECURE RANGING FROM TRANSMITTER TO RECEIVER

CROSS REFERENCE TO RELATED APPLICATIONS

This application claims the benefit of U.S. Provisional Application No. 63/505,068, filed on May 31, 2023. The content of the application is incorporated herein by reference.

BACKGROUND

Wi-Fi ranging technology utilizes time-of-flight measurements to estimate the distance between two Wi-Fi devices. Over the past decade, this technology has empowered application developers and solution implementers to offer a diverse range of services, including indoor navigation, asset tracking, geofencing, and access control (locking/unlocking). These services come with heightened accuracy and performance while minimizing real estate and overall bill of materials costs.

Wi-Fi ranging technologies have been integrated into billions of devices worldwide, demonstrating accelerated adoption. Ranging capabilities have consistently improved across multiple generations. For precise measurements, a Wi-Fi radio relies heavily on several fundamental characteristics: the utilization of frequency bandwidth, the application of multi-antenna technology, the power of transmission, and the sensitivity of the receiver. Application developers can further enhance measurement accuracy by employing statistical methods, such as averaging individual measurements and utilizing location tracking algorithms. Additionally, faster ranging speeds contribute to improved accuracy by providing more measurements per second for calculations.

Modern mobile devices harness Wi-Fi location, Bluetooth, and Ultra-Wideband technologies, along with ranging capabilities, for a diverse array of applications. Among these, Wi-Fi ranging technology employs time-of-flight measurements t estimate distances between Wi-Fi devices. Since its inception, remarkable progress has occurred, driven by industry standards and successive generations of chipsets and end products supporting Wi-Fi. These advancements have significantly improved accuracy and performance, enabling a wide range of potential uses.

Additionally, statistical methods are explored that application developers and solution implementers can employ to enhance ranging accuracy in their applications. Drawing from extensive measurement campaigns utilizing Wi-Fi ranging technology, achievable ranging accuracies are implemented in real-world scenarios.

In the majority of use cases, Wi-Fi ranging security threats are not a significant concern. However, discussions around security enhancements often focus on scenarios related to access control, particularly when it comes to unlocking valuable assets like cars. A common worry involves man-in-the-middle attacks, where an attacker intercepts wireless communication (often using Bluetooth technology) and gains unauthorized access to an asset.

To address these concerns, industry standardization bodies have diligently worked on strengthening the security aspects of device-to-device ranging technologies over the past few years. Even for existing generations of Wi-Fi ranging lacking built-in security features, there are ways to significantly enhance security: additional handshake steps, outlier detection methods, and challenge/response sequences above the MAC (Media Access Control) Layer. The upcoming IEEE 802.11az generation technology will introduce further MAC and PHY-level enhancements specifically tailored for contexts such as access control applications involving high-value objects.

Wi-Fi secure ranging has become a prominent topic in the realm of distance-bound protocols. The standard for Wi-Fi secure ranging is denoted as 802.11az. For waveform generation, the Wi-Fi secure ranging waveform is generated using a random bit generator. For instance, it can be created through AES-128 (Advanced Encryption Standard-128) encryption with a unique KEY and a counter. These random bits are then mapped to the per sub-carrier constellation, forming the secure ranging waveform.

For security considerations, the primary purpose of Wi-Fi secure ranging is security. Therefore, devices must be able to determine whether the received secure ranging waveform is reliable or not. In summary, Wi-Fi secure ranging ensures robust and secure distance estimation, contributing to safer and more reliable communication between devices. The devices should be able to detect whether the Wi-Fi communication is attacked or not.

SUMMARY

An embodiment provides an attack detection method for Wi-Fi secure ranging from a transmitter to a receiver. The transmitter applies secure sequences on each symbol and each sub-carrier of K long training fields (LTFs). The receiver receives the K LTFs each having N symbols. The method includes using a channel estimation (CE) result of N symbols in a first LTF of the K LTFs to demodulate symbols in a Kth LTF of the K LTFs to obtain demodulated secure sequences of the symbols in the Kth LTF, generating respective bit error rates (BERs) of the N symbols in the Kth LTF by comparing applied secure sequences of the symbols in the Kth LTF with demodulated secure sequences of symbols in the Kth LTF, generating average BERs for the N symbols in the Kth LTF, and verifying if the Kth LTF has been attacked according to the respective BERs of the N symbols in the Kth LTF and the average BERs for the symbols in the Kth LTF. K and N are positive integers, and K>1.

Another embodiment provides an attack detection method for Wi-Fi secure ranging from a transmitter to a receiver. The transmitter applies secure sequences on each symbol and each sub-carrier of K long training fields (LTFs). The receiver receives the K LTFs each having N symbols. The method includes using a channel estimation (CE) result of N symbols in a first LTF of the K LTFs to generate an expected waveform of N symbols in a Kth LTF of the K LTFs, generating respective mean square errors (MSEs) of the N symbols in the Kth LTF, generating average MSEs for the symbols in the Kth LTF, and verifying if the Kth LTF has been attacked according to the respective MSEs of the N symbols in the Kth LTF and the average MSEs for the symbols in the Kth LTF. K and N are positive integers, and K>1.

Another embodiment provides an attack detection method for Wi-Fi secure ranging. The method includes extracting a channel impulse response (CIR) from a channel estimation result of each long training field (LTF), obtaining a residual part by canceling the CIR from the channel estimation result, generating a channel estimation (CE) mean square error (MSE) of the CIR and the residual part, and verifying if a Kth LTF has been attacked according to a CE MSE of the Kth LTF and an average CE MSE of a first LTF to a (K−1) th LTF. K is a positive integer larger than 1.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a flowchart of an attack detection method for Wi-Fi secure ranging according to an embodiment of the present invention.

FIG. 4 is a flowchart of an attack detection method for Wi-Fi secure ranging according to another embodiment of the present invention.

FIG. 6 is a flowchart of an attack detection method for Wi-Fi secure ranging according to another embodiment of the present invention.

DETAILED DESCRIPTION

Figure 1:
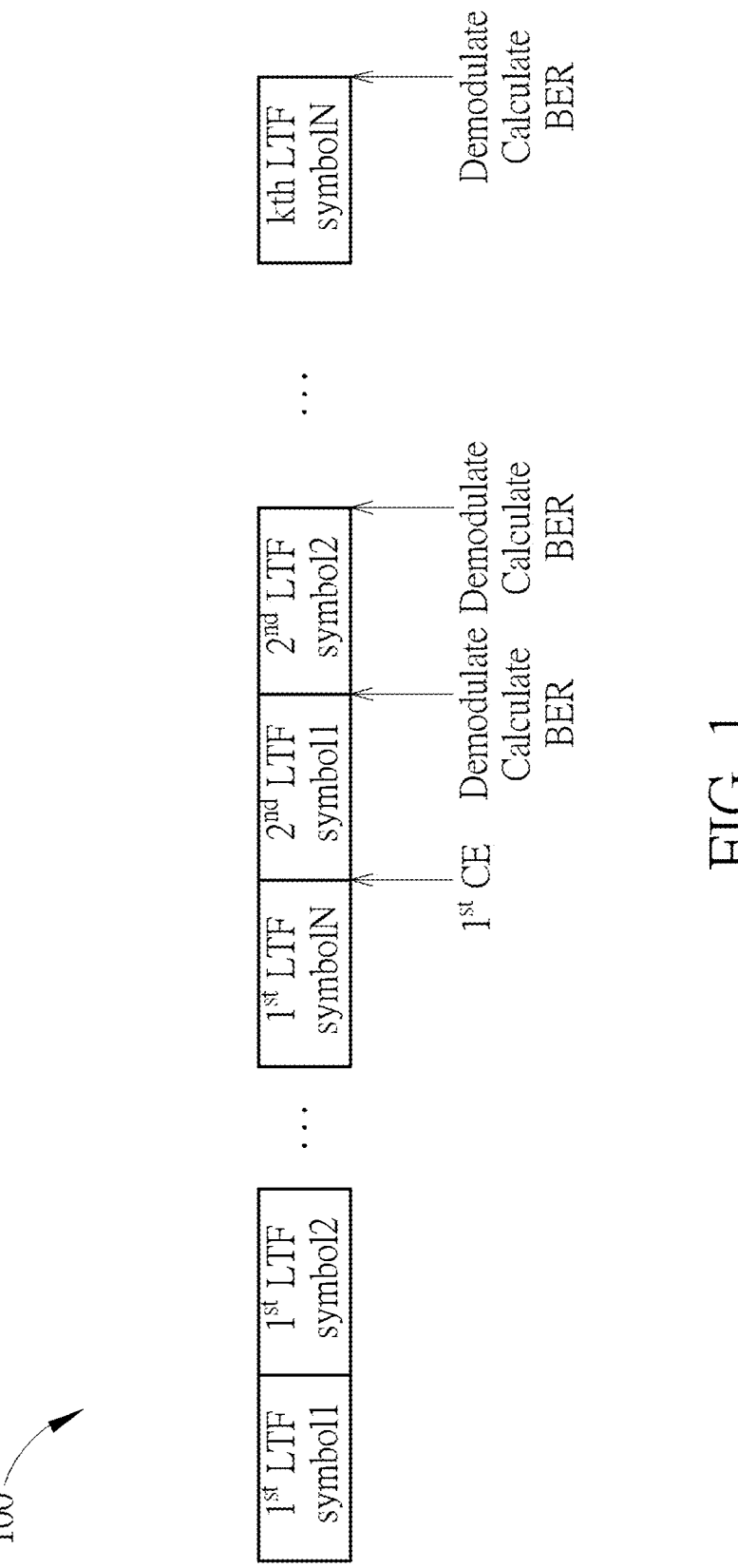
FIG. 1 is a schematic diagram of an attack detection method using bit error rates (BERs) according to an embodiment of the present invention.

Over the years, Wi-Fi networks have faced vulnerabilities and security issues due to inherent flaws in the IEEE (Institute of Electrical and Electronics Engineers) 802.11 standard. For instance, attackers exploit buffered frames, frame aggregation, and frame segmentation to locate users and launch attacks. Even the latest WPA3 (Wi-Fi Protected Access) security protocol is not immune to such issues (e.g., the Dragonblood authentication vulnerability).

Recently, the IEEE introduced the 802.11az security standard, which offers significant advancements. Within wireless local area network (WLAN) networks, 802.11az achieves remarkable positioning accuracy, accurate to within 0.1 meters. This represents a substantial improvement over the current WLAN positioning accuracy (typically 1-2 meters). High-precision positioning authentication further enhances security. IEEE 802.11az seamlessly integrates its positioning protocol into the mainstream IEEE 802.11ax (Wi-Fi 6).

Key benefits include: Enhanced security and authenticity, 2 to 4 times improvement in positioning accuracy and coverage for Wi-Fi networks, 10 times better energy efficiency, significant network scalability, leveraging the Wi-Fi ecosystem's superior link budget for extended range coverage, and spectrum acquisition for long-term technology investment.

In recent developments, the IEEE 802.11az security standard introduces significant enhancements to Wi-Fi networks, particularly in terms of security and positioning accuracy. Users can configure their computers to activate only when their smart watch is within a few inches' proximity. This ensures secure authentication. Similarly, smart devices can unlock car doors, but only if the user is standing within a predefined distance (such as less than one meter). Smart devices also facilitate point-of-sale payments in stores and automated teller machine (ATM) transactions. The close proximity of devices enhances authenticity and thwarts relay attacks.

The first generation of Wi-Fi secure ranging relied on RSSI (Received Signal Strength indicator) and offered modest accuracy (10-15 meters). The second generation, known as FTM (Fine Timing Measurement), used ToF (Time of Flight) and achieved 1-2 meters accuracy at bandwidths up to 160 MHz. It is currently supported by many mobile devices and enterprise networks. IEEE 802.11az, the third generation, achieves positioning accuracy of less than 1 meter and has recently entered the market. For future developments, such as 802.11bk, aim to define Wi-Fi positioning using the 320 MHz Wi-Fi 7 channel, further improving accuracy to sub −0.1 m levels.

The Secure Long Training Field (LTF) mechanism offers robust protection against over-the-air signal manipulation, including timing advance attacks. In such attacks, an adversary introduces a false sense of scope by transmitting a partially advanced message.

IEEE 802.11az builds upon the existing IEEE 802.11 security framework. It leverages the same credentials and security scheme used for regular connections to authenticate 802.11az peer-to-peer protocol signaling.

Each secure LTF transmission utilizes a distinct Advanced Encryption Standard-128 (AES128) sequence, following a specific scheme. These sequences are then mapped to specially designed secure LTF symbols and subcarriers within those symbols. The Sequence Authentication Code (SAC) ensures synchronization between the reception and transmission of pseudo-random AES128 sequences. SAC accounts for media errors and guards against master-in-the-middle attacks. Secure LTF sequences are mapped to dedicated 802.11PHY frames using 64QAM (Quadrature Amplitude Modulation), which encodes 6 bits per subcarrier. This higher modulation scheme increases codeword size, enhances signal entropy, and significantly complicates eavesdropping attempts. Unlike conventional radio channel estimation (using 1-bit BPSK modulation), this approach strengthens security.

In orthogonal frequency-division multiplexing (OFDM) systems like 802.11, symbol redundancy absorbs intersymbol interference through the guard interval. For Secure LTF, a zero-power guard interval replaces this practice, preventing adversaries from repeating attacks. In summary, IEEE 802.11az introduces robust security measures, significantly improving positioning accuracy and defending against various Wi-Fi network attacks.

IEEE 802.11az FTM (Fine Timing Measurement) stands out among wireless location connectivity solutions due to its dynamic adaptability. It can adjust the measurement rate per second and the number of measurements per single-channel access on-the-fly, without requiring service renegotiation. These unique features ensure reliable, uninterrupted, and continuous range/location services. Instantaneous measurement rates can vary significantly, from as high as 10 Hz to as low as 0.01 Hz. This variability is valuable for tracking rapid versus sporadic client motion and compensating for measurement outliers while maintaining a smooth user experience. 802.11az adjusts the number of measurements per channel access by up to 64 times. More statistics lead to an improved signal-to-noise ratio (SNR), enabling reliable and efficient estimates. It also aids in identifying potential attacks.

In settings with multiple access points and mesh networks, the device's location within the house and proximity to specific access points serve as good indicators of medium to long-term data link signals. Beyond location detection, 802.11az supports contextual information for internet thing (IoT) of services (e.g., automatically turning on lights when a user enters a room). Additionally, it assists in optimizing access point (AP) selection algorithms. In summary, 802.11az improves positioning accuracy and device needs to detect the receiving secure ranging waveform is reliable or not for secure purpose.

FIG. 1 is a schematic diagram of an attack detection method 100 using bit error rates (BERs) according to an embodiment of the present invention. In an embodiment, a transmitter sends K LTFs to a receiver, and each LTF has N symbols. When receiving the first LTF with N symbols, the receiver can generate a channel estimation result according to the first LTF. The channel estimation process is shown as the following equation:

$$Y = H\Theta\tilde{P}L + n, \text{ where } \tilde{P} = P\Phi$$

where Y is a received signal, H is a channel matrix, $\Theta$ is a secure per stream phase rotation matrix, P is a spatial time stream (STS) P matrix, $\Phi$ is a common phase matrix, L is a secure 64QAM random sequence matrix, and n is a received noise matrix.

By using the received signal of the N symbols in the first LTF, the channel matrix H can be estimated with the known secure per stream phase rotation matrix $\Theta$, spatial time stream (STS) P matrix P, common phase matrix $\Phi$, and secure 64QAM random sequence matrix L. Then, the estimated channel matrix H can be used to demodulate all symbols in the second LTF to the Kth LTF to obtain demodulated secure sequences of the symbols in the second LTF to the Kth LTF. By comparing the demodulated secure sequences of the symbols in the second LTF to the Kth LTF and the received secure sequences of the symbols in the second LTF to the Kth LTF, the bit error rates (BERs) of the symbols in the second LTF to the Kth LTF can be generated.

FIG. 2 is a flowchart of an attack detection method 200 for Wi-Fi secure ranging from a transmitter to a receiver according to an embodiment of the present invention. The transmitter applies secure sequences on each symbol and each sub-carrier of K long training fields (LTFs). The receiver receives the K LTFs each having N symbols. The attack detection method 200 includes the following steps:

Step S206: use a channel estimation (CE) result of N symbols in a first LTF to demodulate symbols in a Kth LTF to obtain demodulated secure sequences of the symbols in the Kth LTF;

Step S208: generate a bit error rate (BER) of each symbol in the Kth LTF by comparing applied secure sequences of the symbols in the Kth LTF with demodulated secure sequences of corresponding symbols in the Kth LTF;

Step S210: generate an average BER for each symbol in the Kth LTF; and

Step S212: verify if the Kth LTF has been attacked according to BERs of symbols in the Kth LTF and average BERs for the corresponding symbols in the Kth LTF.

The secure sequences are applied on each symbol and each sub-carrier of the first to the Kth LTFs by the transmitter. A subcarrier is a sideband of a radio frequency carrier wave, which is modulated to send additional information. It's essentially a carrier wave that is modulated by a signal wave and then used with other subcarriers to modulate the main carrier wave. There is no physical difference between a carrier and a subcarrier; the "sub" implies that it has been derived from a carrier, which has been amplitude or frequency modulated by a steady signal and has a constant frequency relation to it. The receiver receives the first LTF to the Kth LTFs each having N symbols transmitted from the transmitter. N and K are positive integers. In step S206, a channel estimation (CE) result of N symbols in a first LTF is used to demodulate symbols in a Kth LTF to obtain demodulated secure sequences of the symbols in the Kth LTF where K is an integer and K>1.

By using the received signal of N symbols in the first LTF, the channel matrix H can be estimated with the known secure per stream phase rotation matrix $\Theta$, spatial time stream (STS) P matrix P, common phase matrix $\Phi$, and secure 64QAM random sequence matrix L. Then, the estimated channel matrix H can be used to demodulate symbols in a Kth LTF to obtain demodulated secure sequences of the symbols in the Kth LTF. In step S208, a bit error rate (BER) of each symbol in the Kth LTF is generated by comparing applied secure sequences of the symbols in the Kth LTF with demodulated secure sequences of the corresponding symbols in the Kth LTF. Then in step S210, an average BER for each symbol in the Kth LTF is generated. The average BER for an mth symbol in the Kth LTF is an average of BERs of symbols from a first symbol in a second LTF to an (m−1) th symbol in the Kth LTF, and m is an integer and N≥m>1. The average BER for a first symbol in the Kth LTF is an average of BERs of symbols from a first symbol in a second LTF to an Nth symbol in the (K−1) th LTF. In step S212, if any BER of the Kth LTF is larger than a sum of the corresponding average BER and a threshold, determining the Kth LTF has been attacked. If every BER of the Kth LTF is smaller than a sum of the corresponding average BER and a threshold, determining the Kth LTF has not been attacked.

Figure 3:
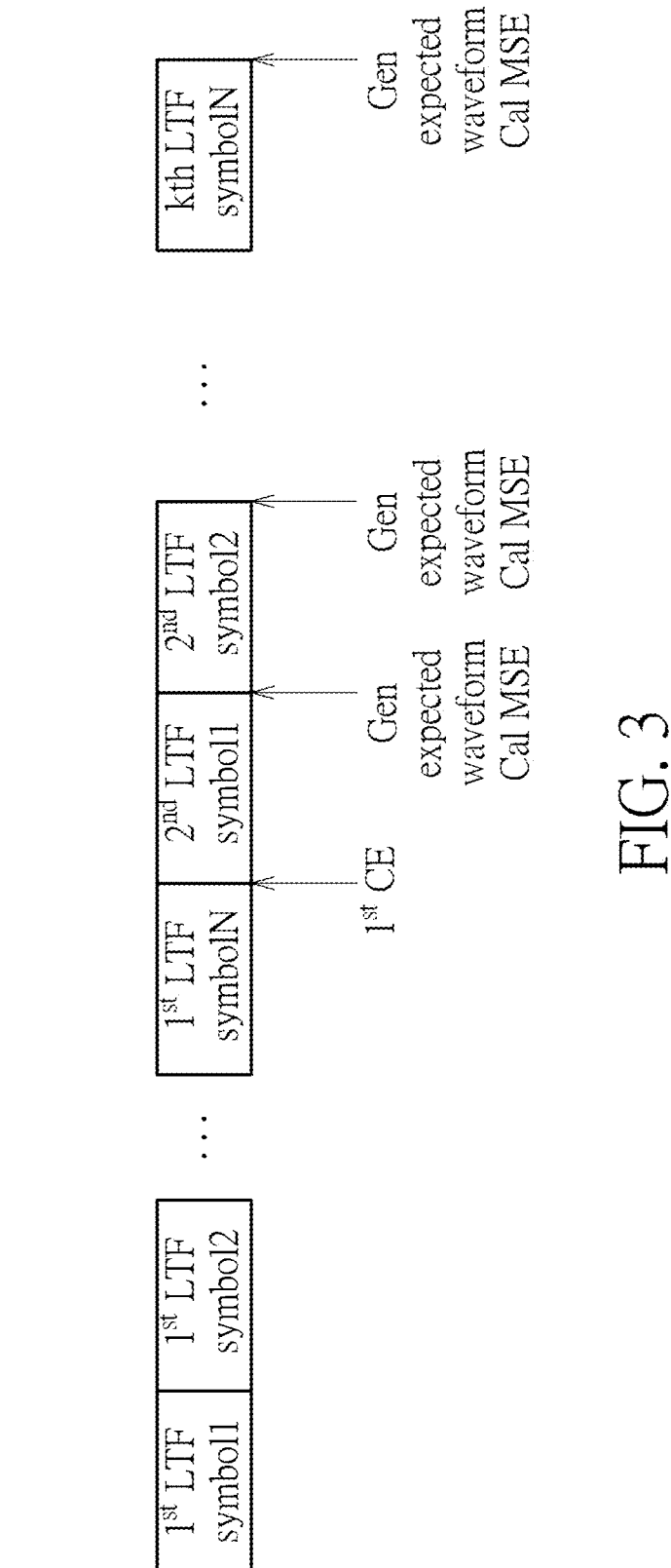
FIG. 3 is a schematic diagram of an attack detection method using mean square error (MSE) according to another embodiment of the present invention.

FIG. 3 is a schematic diagram of an attack detection method 300 using mean square error (MSE) according to another embodiment of the present invention. In an embodiment, a transmitter sends K LTFs to a receiver, and each LTF has N symbols. When receiving the first LTF with N symbols, the receiver can generate a channel estimation result according to the first LTF. By using the channel estimation (CE) result of the N symbols in the first LTF, the channel matrix H can be estimated with the known secure per stream phase rotation matrix $\Theta$, spatial time stream (STS) P matrix P, common phase matrix $\Phi$, and secure 64QAM random sequence matrix L. Then, the estimated channel matrix H can be used to generate expected waveforms of the symbols in the second LTF to the Kth LTF. By comparing the expected waveforms and the received waveforms, the mean square errors (MSEs) of the symbols in the second LTF to the Kth LTF can be generated.

FIG. 4 is a flowchart of an attack detection method 400 for Wi-Fi secure ranging from a transmitter to a receiver according to another embodiment of the present invention. The transmitter applies secure sequences on each symbol and each sub-carrier of K long training fields (LTFs). The receiver receives the K LTFs each having N symbols. The attack detection method 400 includes the following steps:

Step S406: use a channel estimation (CE) result of N symbols in a first LTF to generate an expected waveform of N symbols in a Kth LTF;

Step S408: generate a mean square error (MSE) of each symbol in the Kth LTF;

Step S410: generate an average MSE for each symbol in the Kth LTF; and

Step S412: verify if the Kth LTF has been attacked according to MSEs of symbols in the Kth LTF and average MSEs for corresponding symbols in the Kth LTF.

The secure sequences are applied on each symbol and each sub-carrier of the first to the Kth LTFs by the transmitter. And the receiver receives the first LTF to the Kth LTFs each having N symbols. N and K are positive integers. In step S406, a channel estimation (CE) result of N symbols in a first LTF is used to generate an expected waveform of N symbols in the Kth LTF.

By using a received signal of N symbols in the first LTF, the channel matrix H can be estimated with the known secure per stream phase rotation matrix $\Theta$, spatial time stream (STS) P matrix P, common phase matrix $\Phi$, and secure 64QAM random sequence matrix L. Then, the estimated channel matrtix H can be used to generate an expected waveform in the Kth LTF. In step S408, a mean square error (MSE) of each symbol in the Kth LTF is generated. Then, in step S410, an average MSE for each symbol in the Kth LTF is generated. The average MSE for an mth symbol in the Kth LTF is an average of MSEs of symbols from a first symbol in a second LTF to an (m−1) th symbol in the Kth LTF, and m is an integer and N≥m>1. The average MSE for a first symbol in the Kth LTF is an average of MSEs of symbols from a first symbol in a second LTF to an Nth symbol in the (K−1) th LTF. In step S412, if any MSE of the Kth LTF is larger than a sum of the corresponding average MSE and a threshold, determining the Kth LTF has been attacked. If every MSE of the Kth LTF is smaller than a sum of the corresponding average MSE and a threshold, determining the Kth LTF has not been attacked.

Figure 5:
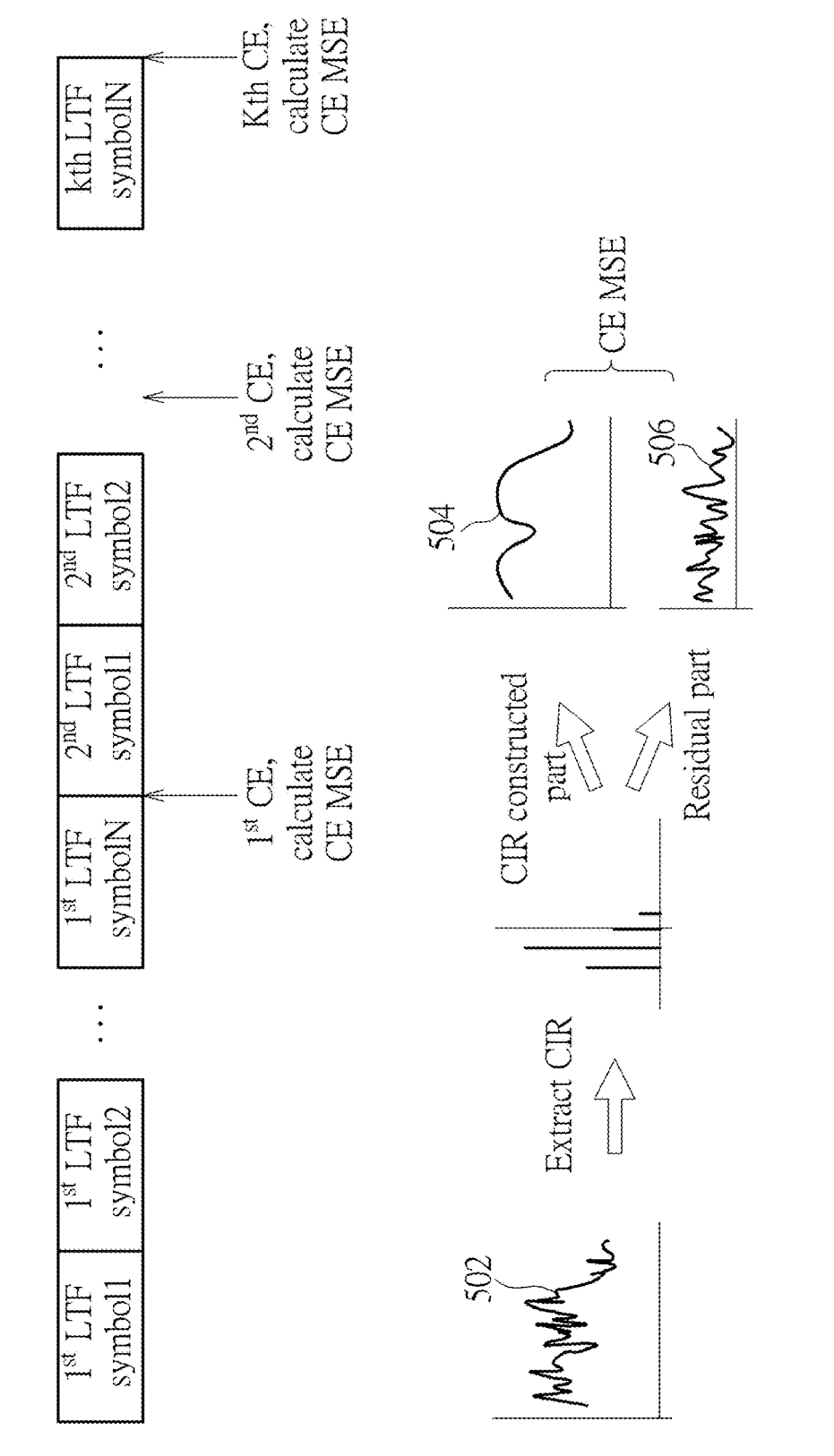
FIG. 5 is a schematic diagram of an attack detection method using channel estimation (CE) mean square error (MSE) according to another embodiment of the present invention.

FIG. 5 is a schematic diagram of an attack detection method 500 using channel estimation (CE) mean square error (MSE) according to another embodiment of the present invention. In an embodiment, a transmitter sends K LTFs to a receiver, and each LTF has N symbols. When receiving the first LTF with N symbols, the receiver can generate a channel estimation result 502 according to the first LTF. A channel impulse response (CIR) part 504 and a residual part 506 can be extracted from the channel estimation result 502. In an embodiment, the CIR part 504 is generated by matching pursuit algorithm. In another embodiment, the CIR part 504 can be generated by interpolating the channel estimation result by nearby sub-carriers of the first LTF. The residual part 506 can be generated by canceling the CIR part in the channel estimation result. The CE MSE can be calculated according to a power ratio between the CIR part 504 and the residual part 506 for each LTF.

FIG. 6 is a flowchart of an attack detection method 600 for Wi-Fi secure ranging according to another embodiment of the present invention. The attack detection method 600 includes the following steps:

Step S602: extract a channel impulse response (CIR) 504 from a channel estimation result 502 of each long training field (LTF);

Step S604: obtain a residual part 506 by canceling the CIR 504 from the channel estimation result 502;

Step S606: generate a channel estimation (CE) mean square error (MSE) of the CIR 504 and the residual part 506; and Step S608: verify if a Kth LTF has been attacked according to a CE MSE of the Kth LTF and an average CE MSE of a first LTF to a (K−1) th LTF.

In step S602, a channel impulse response (CIR) 504 is extracted from a channel estimation result 502 of each long training field (LTF). In an embodiment, the CIR 504 can be extracted from the channel estimation results 502 of each LTF by using a matching pursuit algorithm. In another embodiment, the CIR 504 can be extracted from the channel estimation results 502 of each LTF by interpolating channel estimation results 502 by nearby sub-carriers of the each LTF. In step S604, a residual part 506 is obtained by canceling the CIR 504 from the channel estimation result 502. In step S606, a channel estimation (CE) mean square error (MSE) of the CIR 504 and the residual part 506 is generated. Then, an average CE MSE of the first LTF to the (K−1) th LTF is generated. In step S608, verify if the Kth LTF has been attacked according to a CE MSE of the Kth LTF and the average CE MSE.

In an embodiment, if the CE MSE of the Kth LTF is larger than a sum of the average CE MSE and a threshold, determine the Kth LTF has been attacked. If the CE MSE of the Kth LTF is smaller than a sum of the average CE MSE and a threshold, determine the Kth LTF has not been attacked. The CE MSE represents the power ratio of the CIR 504 and the residual part 506. Therefore, the absolute value of the CE MSE can be compared to a threshold to verify whether the LTF is attacked or not. In another embodiment, if the CE MSE of the Kth LTF is larger than a threshold, determine the Kth LTF has been attacked. If the CE MSE of the Kth LTF is smaller than a threshold, determine the Kth LTF has not been attacked.

In conclusion, the attack detection methods can detect attacks by using BER of the LTF, MSE of the waveform, and/or CE MSE of the CIR 504 and residual part 506. By using the attack detection methods, 802.11az with 0.1 m positioning accuracy can avoid the negative influence from the communication or other forms of attacks and verify whether the received waveform is reliable or not.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An attack detection method for Wi-Fi secure ranging from a transmitter to a receiver, the transmitter applying secure sequences on each symbol and each sub-carrier of K long training fields (LTFs), the receiver receiving the K LTFs each having N symbols, the method comprising:

using a channel estimation (CE) result of N symbols in a first LTF of the K LTFs to demodulate symbols in a Kth LTF of the K LTFs to obtain demodulated secure sequences of the symbols in the Kth LTF;

generating respective bit error rates (BERs) of the N symbols in the Kth LTF by comparing applied secure sequences of the symbols in the Kth LTF with demodulated secure sequences of the symbols in the Kth LTF;

generating average BERs for the N symbols in the Kth LTF; and generating an attack detection result for the Kth LTF according to the respective BERs of the N symbols in the Kth LTF and the average BERs for the symbols in the Kth LTF;

wherein K and N are positive integers, and K>1.

2. The method of claim 1, further comprising using a channel matrix, a secure per stream phase rotation matrix, a spatial time stream P matrix, a common phase matrix, and a secure 64QAM (quadrature amplitude modulation) random sequence matrix to generate the CE result.

3. The method of claim 1, wherein an average BER for an mth symbol in the Kth LTF is an average of BERs of symbols from a first symbol in a second LTF to an (m−1) th symbol in the Kth LTF, where m is an integer and N≥m>1.

4. The method of claim 1, wherein an average BER for a first symbol in the Kth LTF is an average of BERs of symbols from a first symbol in a second LTF to an Nth symbol in a (K−1) th LTF.

5. The method of claim 1, further comprising:

when any BER of the Kth LTF is larger than a sum of a corresponding average BER and a threshold, determining the Kth LTF has been attacked.

6. The method of claim 1, further comprising:

when every BER of the Kth LTF is smaller than a sum of a corresponding average BER and a threshold, determining the Kth LTF has not been attacked.

7. An attack detection method for Wi-Fi secure ranging from a transmitter to a receiver, the transmitter applying secure sequences on each symbol and each sub-carrier of K long training fields (LTFs), the receiver receiving the K LTFs each having N symbols, the method comprising:

using a channel estimation (CE) result of N symbols in a first LTF of the K LTFs to generate an expected waveform of N symbols in a Kth LTF of the K LTFs;

generating respective mean square errors (MSEs) of the N symbols in the Kth LTF;

generating average MSEs for the symbols in the Kth LTF; and generating an attack detection result for the Kth LTF according to the respective MSEs of the N symbols in the Kth LTF and the average MSEs for the symbols in the Kth LTF;

wherein K and N are positive integers, and K>1.

8. The method of claim 7, further comprising using a channel matrix, a secure per stream phase rotation matrix, a spatial time stream P matrix, a common phase matrix, and a secure 64QAM (quadrature amplitude modulation) random sequence matrix to generate the CE result.

9. The method of claim 7, wherein an average MSE for an mth symbol in the Kth LTF is an average of MSEs of symbols from a first symbol in a second LTF to an (m−1) th symbol in the Kth LTF, where m is an integer and N≥m>1.

10. The method of claim 7, wherein an average MSE for a first symbol in the Kth LTF is an average of MSEs of symbols from a first symbol in a second LTF to an Nth symbol in a (K−1) th LTF.

11. The method of claim 7, further comprising:

when any MSE of the Kth LTF is larger than a sum of a corresponding average MSE and a threshold, determining the Kth LTF has been attacked.

12. The method of claim 7, further comprising:

when every MSE of the Kth LTF is smaller than a sum of a corresponding average MSE and a threshold, determining the Kth LTF has not been attacked.

13. An attack detection method for Wi-Fi secure ranging, comprising:

extracting a channel impulse response (CIR) from a channel estimation result of each long training field (LTF);

obtaining a residual part by canceling the CIR from the channel estimation result;

generating a channel estimation (CE) mean square error (MSE) of the CIR and the residual part; and generating an attack detection result for the Kth LTF according to a CE MSE of the Kth LTF and an average CE MSE of a first LTF to a (K−1) th LTF;

wherein K is a positive integer larger than 1.

14. The method of claim 13, wherein extracting the CIR from the channel estimation result of the each LTF is extracting the CIR from the channel estimation result of the each LTF by using a matching pursuit algorithm.

15. The method of claim 13, wherein extracting the CIR from the channel estimation result of the each LTF is extracting the CIR from the channel estimation result of the each LTF by interpolating the channel estimation results by nearby sub-carriers of the each LTF.

16. The method of claim 13, further comprising:

when the CE MSE of the Kth LTF is larger than a threshold, determining the Kth LTF has been attacked.

17. The method of claim 13, further comprising:

when the CE MSE of the Kth LTF is smaller than a threshold, determining the Kth LTF has not been attacked.

18. The method of claim 13, further comprising:

when the CE MSE of the Kth LTF is larger than a sum of the average CE MSE and a threshold, determining the Kth LTF has been attacked.

19. The method of claim 13, further comprising:

when the CE MSE of the Kth LTF is smaller than a sum of the average CE MSE and a threshold, determining the Kth LTF has not been attacked.

20. The method of claim 13, wherein the CE MSE is a power ratio of the CIR and the residual part.

* * * * *